US010326263B2

(12) United States Patent
Haskins

(10) Patent No.: US 10,326,263 B2
(45) Date of Patent: Jun. 18, 2019

(54) ELECTRICAL UNIT ADAPTED TO QUICK INSTALL AN ELECTRICAL OUTLET, BREAKER BOX WITHOUT DIRECT ATTACHMENT OF ELECTRICAL CABLES

(71) Applicant: Thomas Haskins, Holbrook, MA (US)

(72) Inventor: Thomas Haskins, Holbrook, MA (US)

(73) Assignee: Thomas E. S. Haskins, Holbrook, MA (US)

( * ) Notice: Subject to any disclaimer, the term of this patent is extended or adjusted under 35 U.S.C. 154(b) by 0 days.

(21) Appl. No.: 16/010,358

(22) Filed: Jun. 15, 2018

(65) Prior Publication Data

US 2018/0366929 A1 Dec. 20, 2018

Related U.S. Application Data

(60) Provisional application No. 62/519,910, filed on Jun. 15, 2017.

(51) Int. Cl.
*H02G 3/16* (2006.01)
*H02B 1/06* (2006.01)
(Continued)

(52) U.S. Cl.
CPC ............. *H02G 3/16* (2013.01); *H02B 1/06* (2013.01); *H02B 1/40* (2013.01); *H02G 3/085* (2013.01)

(58) Field of Classification Search
CPC ............ H02G 3/16; H02G 3/085; H02G 3/14; H02G 3/083; H02G 3/086; H02B 1/06;
(Continued)

(56) References Cited

U.S. PATENT DOCUMENTS 4,295,018 A * 10/1981 Borrelli ................. H02B 1/056
174/53
6,945,815 B1 * 9/2005 Mullally ............... H01H 1/5866
439/180

* cited by examiner

*Primary Examiner* — Mandeep S Buttar

(57) ABSTRACT

Disclosed is an electrical unit which is adapted to quick connect electric cables directly to a gang box. The electrical unit allows quick connect of an electrical outlet to the gang box without electrical wires. Further, the electrical outlet having energizable screws. The electrical unit includes plurality of receiving clamps and plurality of receiving prong. The plurality of receiving clamps energize the gang box directly from the cable wires. The neutral wire, ground wire and the supply wire energize the gang box. The plurality of receiving prongs configured on the inside walls of the gang box to directly connect with the receiving clamps with no electrical wiring. The first receiving prong, the second receiving prong and the third receiving prong is configured to press against at least one electrical outlet energizable screw to create a neutral connection, ground connection and a supply connection respectively between the neutral receiving clamp, ground receiving clamp and the supply receiving clamp respectively and the electrical outlet. Further, the electrical unit is adapted to quick connect electric cables directly to a breaker box, a gang box and an electrical outlet. The electrical outlet receives power directly from the electrical cable through the receiving clamps and the receiving prongs with substantially less manual wiring requirements the gang box. The electrical cable receives power directly from the power supply cable through the breaker via the second receiving clamps and the second receiving prongs without manual wiring requirements inside the breaker box.

9 Claims, 5 Drawing Sheets

(51) Int. Cl.
*H02B 1/40* (2006.01)
*H02G 3/08* (2006.01)

(58) Field of Classification Search
CPC ........ H02B 1/40; H01R 25/006; H01R 24/78; H01R 31/06; H01R 13/6666; H01R 25/162; H01R 13/652; H01R 24/20; H01R 24/22; H01R 9/24; H01R 2105/00
USPC ...... 439/535, 106, 650, 76.1, 682, 108, 137, 439/135, 144, 620.21; 174/53, 59, 66, 174/67, 50, 58, 481, 97, 154, 480, 63, 51; 361/624, 42, 641; 220/241, 3.2, 3.8, 220/4.02; 248/906
See application file for complete search history.

US 10,326,263 B2

ELECTRICAL UNIT ADAPTED TO QUICK INSTALL AN ELECTRICAL OUTLET, BREAKER BOX WITHOUT DIRECT ATTACHMENT OF ELECTRICAL CABLES

CROSS-REFERENCE TO RELATED APPLICATION

This application claims the benefit of U.S. Provisional Patent Application Ser. No. 62/51,9910 entitled "AN ELECTRICAL UNIT ADAPTED TO QUICK INSTALL AN ELECTRICAL OUTLET OR AN ELECTRICAL SWITCH INTO A GANG BOX" which was filed Jun. 15, 2017. The entirety of the aforementioned application is herein incorporated by reference.

BACKGROUND OF THE INVENTION

1. Field of the Invention

The present invention generally relates to an electrical unit adapted to be disposed within a gang box or a breaker box or a breaker, and more particularly relates to the electrical unit adapted to quick install an electrical outlet, breaker box without direct attachment of electrical cables.

2. Description of Related Art

In providing electrical power to commercial and residential buildings, a main power line typically carrying 100-200 Amps of 220 VAC single phase or more power enters the building from an electric company power grid and is connected to a breaker box that distributes power to the entire building through the breakers. In the breaker box, the 220 VAC power is center tapped with a bus with a neutral return bus and a safety ground bus to provide two 220 and 110 VAC sources of opposite polarity and ground terminal connected to the earth.

In the breaker box, power from the main power line is divided into branch circuits each of which typically provides 220 or 110 VAC power circuit breakered at 15 to 60 or more Amps to several plugs, switches, and/or other electrical units located in different areas of the building. In providing such branch circuits, multi-conductor electrical cables must be routed from a branch circuit breaker in the main breaker box to gang boxes that contain each of the electrical outlets or switches in the branch circuit.

Typically, a breaker box includes a main breaker, circuit or "branch" breakers, a supply bus, a neutral bus and one or more ground buses, along with punchout holes for installing breakers and electrical cables to the box using cable clamps. The process of installing electric cables to the box is time consuming and complex as it requires one to peel off the electric cable outer insulation to 18 inches and electric wire inner insulation to quarter inch.

Typically, a gang box includes one or more punchout, plastic spring-tensioned or screw-tighten ports to insert one or more cables. A method to attach the box to the building and ports to receive electrical outlet installation screws. Further typically, electrical outlet includes three or more receiving ports to receive the electrical plug from the lamp or other device being powered and five or more receiving screws to receive the wires from the electrical cables, rear ports for access to quick-connect receptacles inside the outlet to receive same wires from the electrical cables as an alternative and quick method of installation and two installation screws.

Typically, an electrical breaker includes one receiving clamp to receive only the supply wire from the electrical cable being energized by the breaker, one receiving prong to connect only to the supply bus in the breaker box and an internal trigger mechanism to switch off in the event of a circuit overload.

Typically, an electric cable is a group of insulated wires wrapped together in an outer insulation to bring one or more supply, one neutral and one ground service wire to the outlets, switches, etc. through the gang boxes.

Current practice in a building includes the following:

1. In wiring all the main supply cable and all the circuit cables to the breaker box the $1^{st}$ 18 inches of outer insulation must be removed and then each wire from each cable must be carefully routed in an organized fashion to their respective supply, neutral or ground buses. This entails a large amount of time, skill, training and experience. Further, working in such a breaker box when powered entails significant danger of deadly electrical shock.

2. In wiring a branch circuit one is required to route electrical cables from the breaker box and then individual segments of the multi-conductor electrical cable from the interior of one electrical box or "gang box" to the interior of a subsequent electrical box in the circuit. When all electrical boxes are connected with cable segments, the free ends of the cable segments at the interior of each box are connected to outlets, switches and each other to complete the branch circuit.

In completing the branch circuit, the outer insulation sheathing is first stripped off of each free end of cable 4 to 6 inches to expose the internal insulated electrical wires, and the insulation is then stripped off of the end of each wire to expose the copper conductor of the wire. The cables from the gang box are wrapped around outlet screws and they are tightened down or pushed into quick connect ports in the back of the outlet in the case of 14 gauge or smaller.

These conventional methods of wiring a building, however, present a number of problems to the electrician and homeowner. First, from the standpoint of the electrician, the effort it takes to cut and route cable segments between electrical boxes, and then to strip and reconnect the internal wires of the cable using the above-described method is very time consuming and labor intensive. It also causes a space shortage and wire mess problem in the case of a multi-outlet electrical box where many wires have to be kept separate and organized and fit into the box. This can sometimes also create a fire or user electrical shock risk.

Therefore, there is a need of an electrical unit adapted to connect cables to the gang box directly, energizing the gang box, and further the electrical unit should be able to connect the electrical outlet directly to the gang box without wiring attachments required inside the gang box.

Further, the electrical unit should provide quick-connect attachments to reduce labor time and skill or knowledge level requirements. Furthermore, the electrical unit should be worked on safely, exclusively from the outside of the electrical unit, while the electrical unit is still energized, without danger of electric shock.

SUMMARY OF THE INVENTION

In accordance with teachings of the present invention, an electrical unit adapted to quick connect electric cables directly to a gang box is provided.

An objective of the present invention is to provide an electrical unit adapted to quick connect electric cables directly to a gang box. The electrical unit allows quick connect of an electrical outlet to the gang box without electrical wires. Further, the electrical outlet having energizable screws. The electrical unit includes plurality of receiving clamps and plurality of receiving prong.

The plurality of receiving clamps energize the gang box directly from the cable wires. The receiving clamps includes a neutral receiving clamp configured in the gang box to receive neutral wire from the electric cable, a ground receiving clamp configured in the gang box to receive ground wire from the electric cable and a supply receiving clamp configured in the gang box to receive supply wire from the electric cable. The neutral wire, ground wire and the supply wire energize the gang box.

The plurality of receiving prongs configured on the inside walls of the gang box to directly connect with the receiving clamps with no electrical wiring. The first receiving prong configured to press against at least one electrical outlet energizable screw to create a neutral connection between the neutral receiving clamp and the electrical outlet.

The second receiving prong configured to press against at least one electrical outlet energizable screw to create a ground connection between the ground receiving clamp and the electrical outlet. The third receiving prong configured to press against at least one electrical outlet energizable screw to create a supply connection between the supply receiving clamp and the electrical outlet. The electrical outlet receives power directly from the electrical cable through the receiving clamps and the receiving prongs without manual wiring requirements inside the gang box.

Another objective of the invention is to provide the electrical unit with first attachment units to attach the electrical outlet on the gang box, second attachment units to attach electrical wires with the receiving clamps, third attachment units to attach the electrical cables to the gang box, and plurality of non-conductive rivets to attach the receiving prongs and the receiving clamps to the gang box.

In yet another objective of the invention is to provide an electrical unit adapted to quick connect electric cables directly to a breaker box, a gang box and an electrical outlet. The breaker box receives a power supply cable and further the breaker box having plurality of breakers. The electrical unit includes plurality of first receiving clamps, plurality of first receiving prongs, plurality of second receiving clamps and plurality of second receiving prongs, and plurality of buses.

The electrical outlet receives power directly from the electrical cable through the receiving clamps and the receiving prongs without manual wiring requirements inside the gang box; and wherein the electrical cable receives power directly from the power supply cable through the breaker via the second receiving clamps and the second receiving prongs without manual wiring requirements inside the breaker box.

The second receiving clamps energize the electric cables. The second receiving clamps includes a second neutral receiving clamp configured in the breaker to receive neutral wire from the electric cable, a second ground receiving clamp configured in the breaker to receive ground wire from the electric cable; and a second supply receiving clamp configured in the breaker to receive supply wire from the electric cable.

The plurality of second receiving prongs in the breaker energize the electric cable via the second receiving clamps. The second receiving prongs include a second neutral receiving prong configured in the breaker to receive neutral bus in the breaker box, a second ground receiving prong configured in the breaker to receive ground bus in the breaker box, a second supply receiving prong configured in the breaker to receive supply bus in the breaker box.

Another objective of the present invention is to provide the electrical unit with one or more observational windows configured in the breaker box to view installation of electrical wires to the second receiving clamps without opening the breaker box.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION OF DRAWINGS

Figure 1:
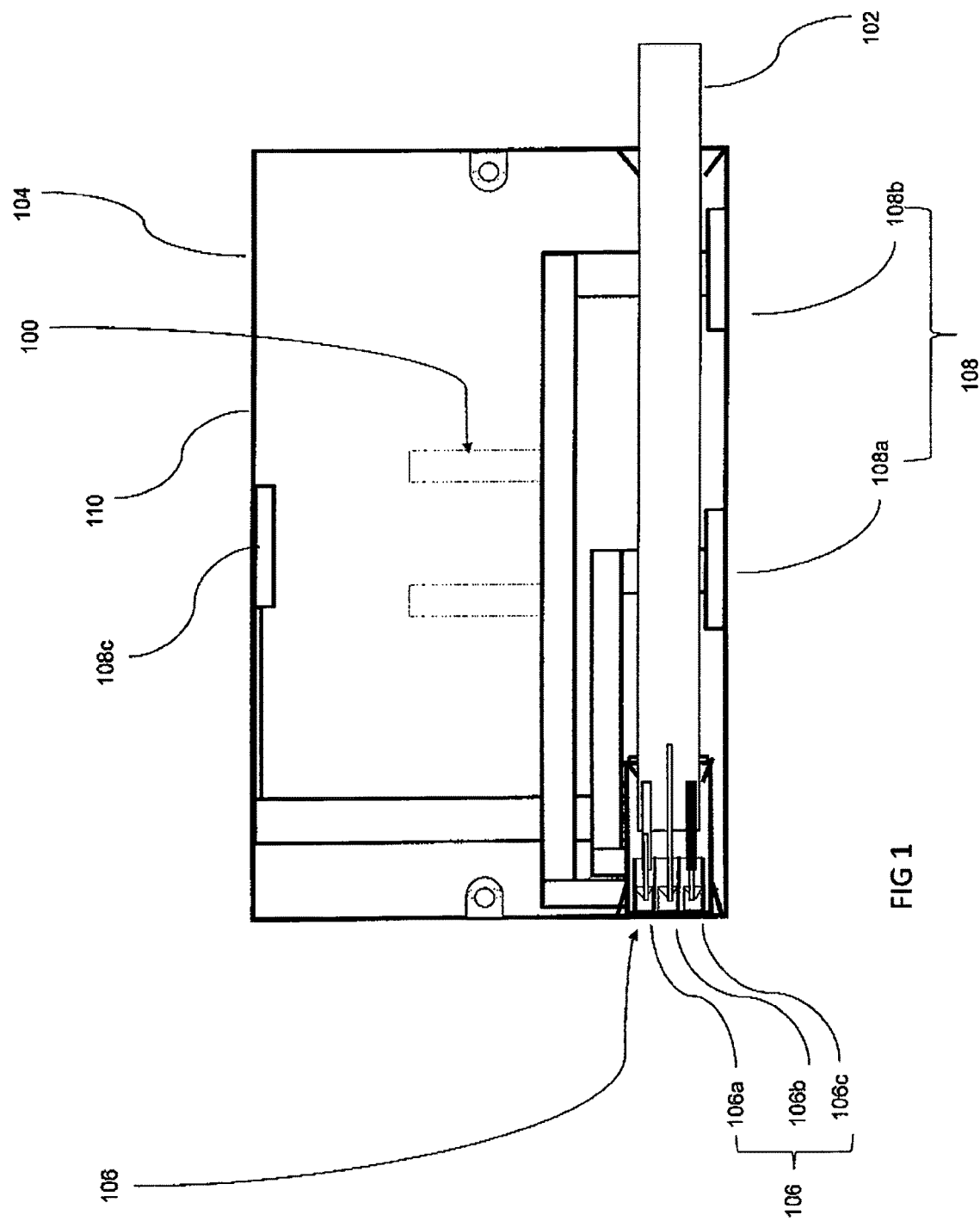
FIG. 1 illustrates a perspective view of an electrical unit for attaching an electric cable to a gang box in accordance with a preferred embodiment of the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 illustrates a perspective view of an electrical unit 100 for attaching an electric cable 102 to a gang box 104 in accordance with a preferred embodiment of the present invention. The electrical unit 100 is adapted to quick connect electric cable 102 directly to the gang box 104. The electric cable 102 includes a neutral wire, a ground wire and a supply wire.

The electrical unit 100 allows quick connect of an electrical outlet (shown in FIG. 2) to the gang box 104 without electrical wires. The electrical outlet (shown in FIG. 2) includes energizable screws. The electrical unit 100 includes plurality of receiving clamps 106 and plurality of receiving prongs 108. The plurality of receiving clamps 106 energize the gang box 104 directly from the electric cable 102. The receiving clamps 106 includes a neutral receiving clamp 106a, a ground receiving clamp 106b and a supply receiving clamp 106c.

The neutral receiving clamp 106a is configured in the gang box 104 to receive neutral wire from the electric cable 102. The ground receiving clamp 106b is configured in the gang box 104 to receive ground wire from the electric cable 102. The supply receiving clamp 106b is configured in the gang box 104 to receive supply wire from the electric cable 102. The neutral wire, ground wire and the supply wire energize the gang box 104.

The plurality of receiving prongs 108 such as 108a, 108b, 108c are configured on the inside walls 110 of the gang box 104 to directly connect with the plurality of receiving clamps 106 with no electrical wiring. The plurality of receiving prongs 108 are explained in detail in conjunction with FIG. 2 of the present invention.

In another object of the present invention, the electrical unit 100 further includes a second attachment unit (not shown in FIGURES) to attach the electrical wires with the receiving clamps, a third attachment unit (not shown in FIGURES) to attach the electrical cables to the gang box 104, and non-conductive rivets 109 to attach the receiving prongs 108 and the receiving clamps 106 to the gang box 104. Examples of the second attachment unit include but not limited to screw, nuts, clamps, bolts, spring loaded and other similar attachment units. Examples of the third attachment unit and the rivets 109 include but not limited to non-conductive screw, nuts, clamps, bolts, spring loaded and other similar non-conductive attachment units.

The first receiving prongs 108 receives power from the first receiving clamps 106. The first receiving prongs 108 and the first receiving clamps 318 are attached to each other via conductive elements 112. In a preferred embodiment of the present invention, the conductive elements 112 are made up of brass. However, it would be readily apparent to those skilled in the art that various other conductive material may be used to build conductive elements 112 without deviating from the scope of the present invention.

Figure 2:
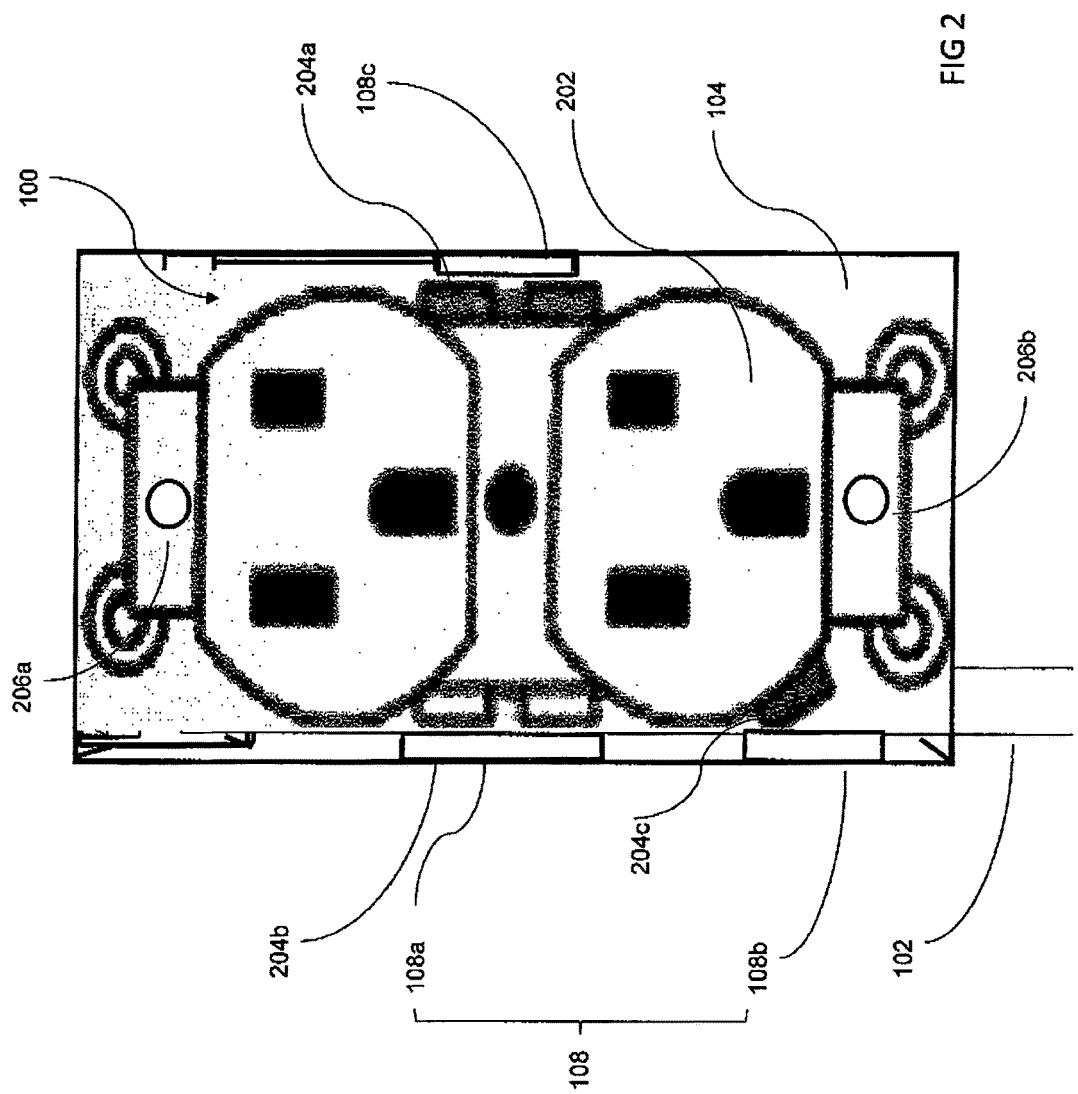
FIG. 2 illustrates a perspective view of the electrical unit embedded between the gang box and the electrical outlet in accordance with a preferred embodiment of the present invention.

FIG. 2 illustrates a perspective view of the electrical unit 100 embedded between the gang box 104 and the electrical outlet 202 in accordance with a preferred embodiment of the present invention. With reference to FIG. 1, the plurality of receiving prongs 108 includes a first receiving prong 108a is configured to press against the electrical outlet energizable screw 204a to create a neutral connection between the neutral receiving clamp (shown in FIG. 1) and the electrical outlet 202.

The second receiving prong 108b is configured to press against at least one electrical outlet energizable screw 204b to create a ground connection between the ground receiving clamp (shown in FIG. 1) and the electrical outlet 202. The third receiving prong 108c is configured to press against at least one electrical outlet energizable screw 204c to create a supply connection between the supply receiving clamp (shown in FIG. 1) and the electrical outlet 202.

The electrical outlet 202 receives power directly from the electrical cable 102 through the receiving clamps (shown in FIG. 1) and the receiving prongs 108 without manual wiring requirements inside the gang box. In a preferred embodiment of the present invention, the receiving prongs 108 and the receiving clamps (shown in FIG. 1) are made up of brass.

However, it would be readily apparent to those skilled in the art that various other conductive material may also be used to build prongs 108 and the receiving clamps (shown in FIG. 1) without deviating from the scope of the present invention. In another preferred embodiment of the present invention, the electrical unit 100 further includes a first attachment unit 206a, 206b to attach electrical outlet 202 on the gang box 104.

The receiving clamps (106, shown in FIG. 1) receives power from the electric cable 102 and transfers the power to the receiving prongs 108 without any direct electric wiring. Further, the receiving prongs 108 directly transfer the power to the electrical unit 202 via the energizable screws 204 without any direct electric wiring.

Figure 3:
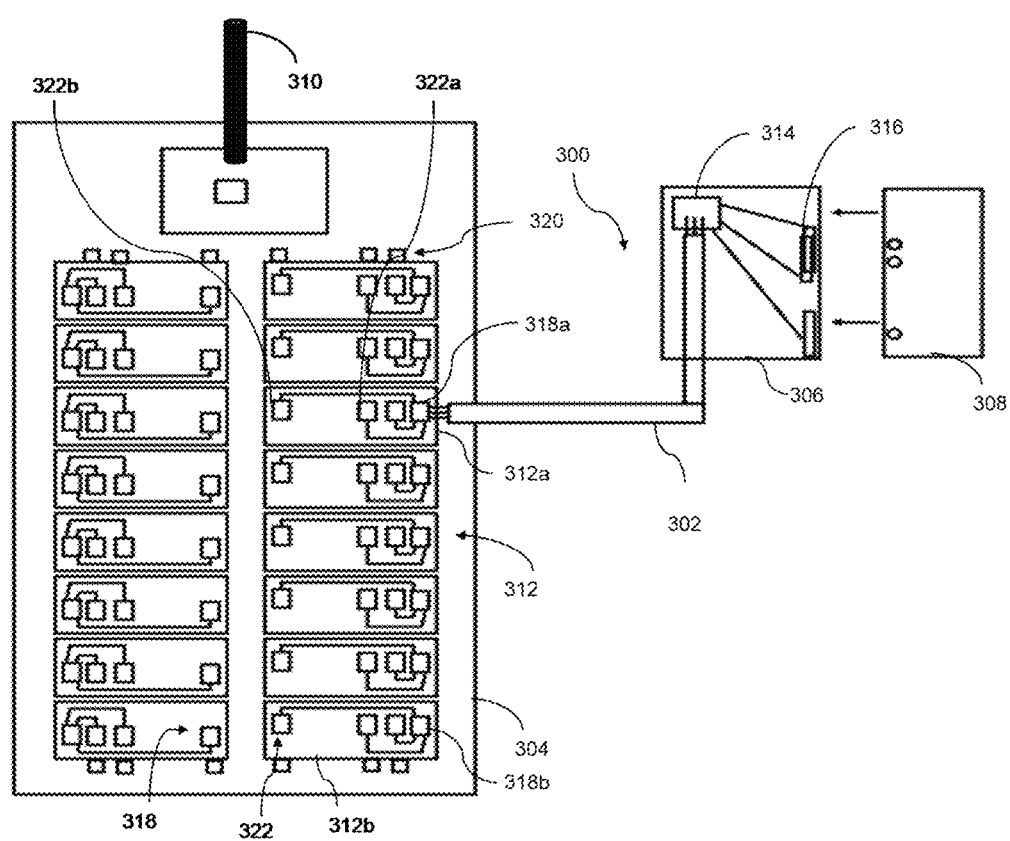
FIG. 3 illustrates a perspective view of electrical unit attached to a breaker box in accordance with another preferred embodiment of the present invention.

FIG. 3 illustrates a schematic view of an electrical unit 300 adapted to quick connect electric cables 302 directly to a breaker box 304, a gang box 306 and an electrical outlet 308 in accordance with another preferred embodiment of the present invention. The electrical unit 300 includes a breaker box 304 for receiving a power supply cable 310 and further the breaker box 304 is having plurality of breakers 312 such as 312a, 312b.

The electrical unit 300 includes plurality of first receiving clamps 314, plurality of first receiving prongs 316, plurality of second receiving clamps 318a; 318b, plurality of buses 320, plurality of second receiving prongs 322a, 322b. The first receiving clamps 314 energizes the gang box 308 from the electric cable 302.

The first receiving clamps 314 include a first neutral receiving clamp, a first ground receiving clamp and a first supply receiving clamp. The functionality of the first neutral receiving clamp, the first ground receiving clamp and the first supply receiving clamp is explained in detail in conjunction with FIG. 1 of the present invention.

The first receiving prongs 316 energize the electrical outlet 308. The first receiving prongs 316 includes a first neutral receiving prong, a first ground receiving prong and a first supply receiving prong. The functionality of the first neutral receiving prong, the first ground receiving prong and the first supply receiving prong is identical to the receiving prongs (shown in FIG. 1 and FIG. 2) and is explained in detail in conjunction with FIG. 1 and FIG. 2 of the present invention.

The plurality of second receiving clamps 318 such as 318a, 318b energizes the electric cables. As shown in FIG. 3, the second receiving clamps 318a includes a second neutral receiving clamp configured in the breaker 312a to receive neutral wire from the electric cable 302, a second ground receiving clamp configured in the breaker 312a to receive ground wire from the electric cable and a second supply receiving clamp configured in the breaker 312a to receive supply wire from the electric cable 302.

The plurality of first receiving clamps 314 and the second receiving clamps 318 works identical to the receiving clamps (106, shown in FIG. 1) and is further explained in detail in conjunction with FIG. 1 and FIG. 2 of the present invention. The plurality of buses 320 are configured in the breaker box 304 and further aligns with the second receiving prongs 322. The plurality of buses 320 includes a neutral bus, a ground bus and a supply bus. The buses 320 connects the power supply cable 310 to the second receiving prongs 322a, 322b. The buses 320 runs across the breakers 312 to maintain power supply.

The plurality of second receiving prongs 322a, 322b in the breaker 312a energize the electric cable 302 via the second receiving clamp 318a. The second receiving prongs 322a include a second neutral receiving prong configured in the breaker 312a to receive neutral bus in the breaker box 304, a second ground receiving prong configured in the breaker 312a to receive ground bus in the breaker box 304, and a second supply receiving prong configured in the breaker 312a to receive supply bus in the breaker box 304.

Figure 4:
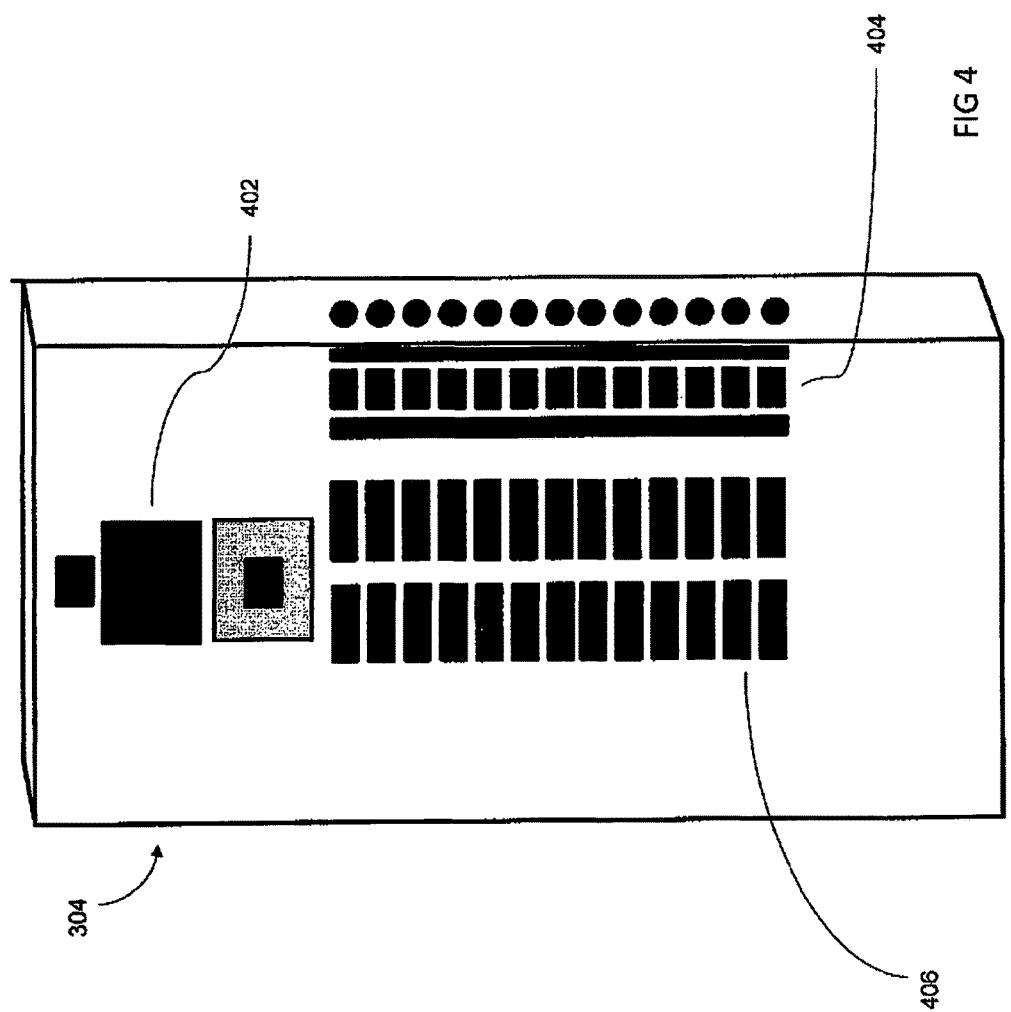
FIG. 4 illustrates a perspective view of the breaker box in accordance with another preferred embodiment of the present invention.

The breaker box 304 is explained in detail in conjunction with FIG. 4 of the present invention.

The electrical outlet 308 receives power directly from the electrical cable 302 through the receiving clamps and the first receiving prongs without manual wiring requirements inside the gang box. The electrical cable 302 receives power directly from the power supply cable 310 through the breaker 312 via the second receiving clamps 318 and the second receiving prongs 322 without manual wiring requirements inside the breaker box 304.

FIG. 4 illustrates a perspective view of the breaker box 304 in accordance with a preferred embodiment of the present invention. The breaker box 304 further includes one or more observational windows 402a, 402b, 402c to view installation of electrical wires to the second receiving clamps. The observational window 402 is a transparent window to view electrical wires insertions/connections.

The breaker box 304 includes side knockout slots 404 for direct side access to breakers (shown in FIG. 3) for electric cables. The breaker box 304 further includes fourth attachment units 408. The fourth attachment units 408 are explained in detail in conjunction with FIG. 5 of the present invention. The breaker box 304 further includes front knockout slots 406 for direct front access to breakers (shown in FIG. 3) and the fourth attachment units 408. The front knockout slots 406 allow operating the fourth attachment unit 408 without opening the breaker box 304.

Figure 5:
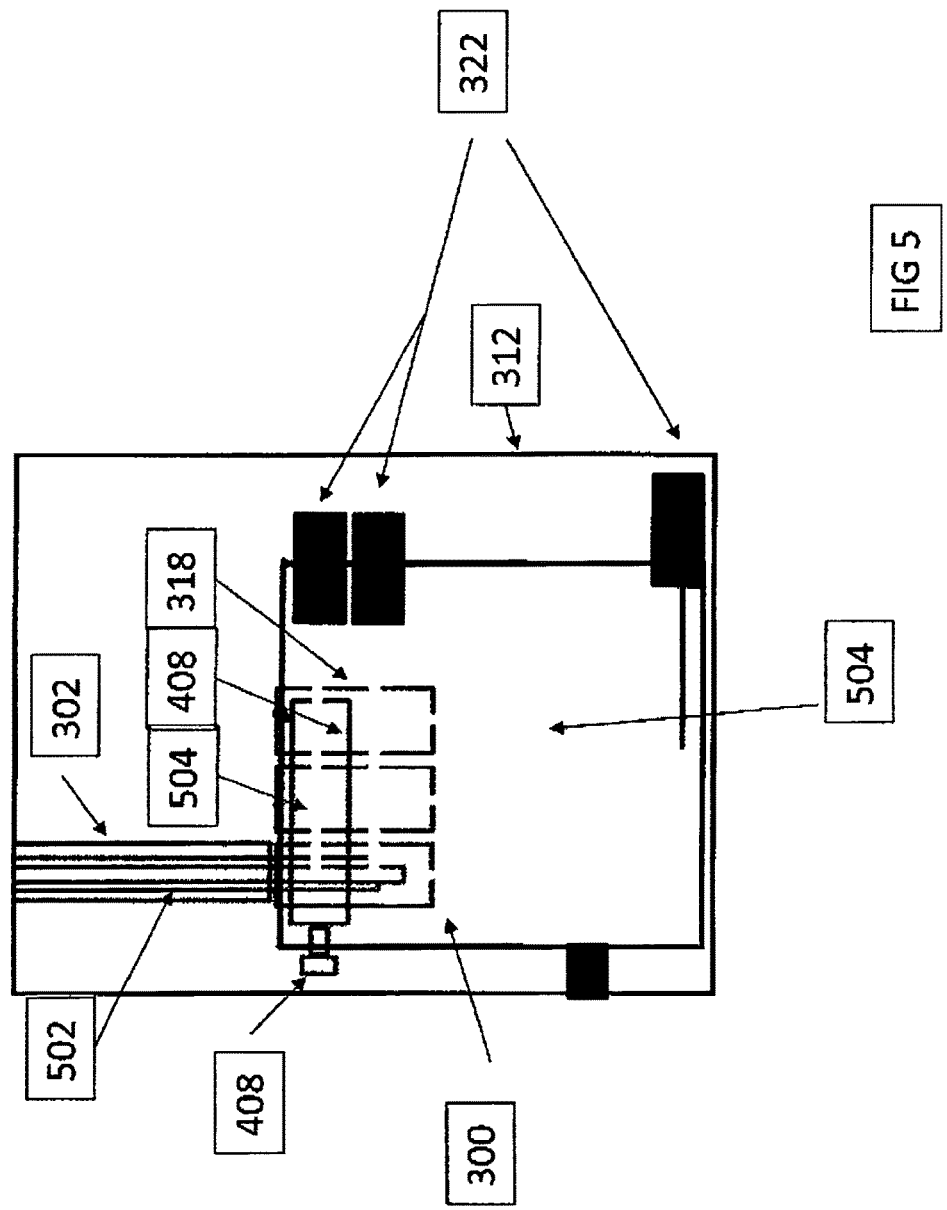
FIG. 5 illustrates a schematic view of electrical unit to show attachment of electric cable to the breaker in accordance with another preferred embodiment of the present invention.

FIG. 5 illustrates a schematic view of electrical unit 300 to show attachment of electric cable 302 to the breaker 312. The cable 302 is connected to the second receiving clamp 318. Further, the fourth attachment unit 408 compresses the second receiving clamps 318 onto the electrical wires 502 received from the electric cable 302.

The second receiving prongs 322 transmits power to the second receiving clamps 318. The second receiving prongs 322 and the second receiving clamps 318 are attached to each other via conductive elements 504. In a preferred embodiment of the present invention, the conductive elements 504 are made up of brass. However, it would be readily apparent to those skilled in the art that various other conductive material may be used to build conductive elements 504 without deviating from the scope of the present invention.

The present invention offers various advantages such as providing quick-connect attachments to reduce labor time and skill or knowledge level requirements. Further, the present invention offers no manual wiring to the breaker box and the electrical outlet. Furthermore, the present invention offers with substantially less manual wiring inside the gang box to transmit power to the electrical outlet.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An electrical unit adapted to quick connect electric cables directly to a gang box comprising a plurality of walls, wherein the electrical cable comprises: a neutral wire, a ground wire and a supply wire, further the electrical unit allows quick connect of an electrical outlet to the gang box without electrical wires, wherein the electrical outlet comprises a plurality of energizable screws, the electrical unit comprising: a plurality of spring loaded receiving clamps to energize the gang box directly from the electrical cable, wherein the plurality of spring loaded receiving clamps comprises: a neutral spring loaded receiving clamp configured in the gang box to receive the neutral wire from the electrical cable; a ground spring loaded receiving clamp configured in the gang box to receive the ground wire from the electrical cable; and a supply spring loaded receiving clamp configured in the gang box to receive the supply wire from the electrical cable; wherein the neutral wire, ground wire and the supply wire energize the gang box; the gang box further includes a plurality of receiving prongs configured on the inside of the plurality of walls of the gang box to directly connect with the plurality of spring loaded receiving clamps with no electrical wiring, wherein a first receiving prong is configured to press against at least one of the plurality of energizable screws of the electrical outlet to create a neutral connection between the neutral spring loaded receiving clamp and the electrical outlet; a second receiving prong is configured to press against at least one of the plurality of energizable screws of the electrical outlet to create a ground connection between the ground spring loaded receiving clamp and the electrical outlet; and a third receiving prong is configured to press against at least one of the plurality of energizable screws of the electrical outlet to create a supply connection between the supply spring loaded receiving clamp and the electrical outlet, wherein the electrical outlet receives power directly from the electrical cable through the plurality of spring loaded receiving clamps and the plurality of receiving prongs without manual wiring requirements; wherein the respective plurality of spring loaded receiving clamps and the respective plurality of receiving prongs are each separable connected to each other via a conductive element.

2. The electrical unit according to claim 1, further comprises, a first attachment unit to attach the electrical outlet on the gang box.

3. The electrical unit according to claim 1, further comprises, a third attachment unit to attach the electrical cables to the gang box.

4. The electrical unit according to claim 1, further comprising a plurality of non-conductive rivets to attach the plurality of receiving prongs and the plurality of spring loaded receiving clamps to the gang box.

5. An electrical unit adapted to quick connect electrical cables directly to a gang box and an electrical outlet having a plurality of energizable screws, the electrical unit comprising: a breaker box for receiving a power supply cable and further comprising a plurality of breakers; a plurality of first receiving clamps to energize the gang box from the electrical cable; wherein the plurality of first spring loaded receiving clamps comprises: a first neutral spring loaded receiving clamp configured in the gang box to receive a neutral wire from the electrical cable; a first ground spring loaded receiving clamp configured in the gang box to receive a ground wire from the electrical cable; and a first supply spring loaded receiving clamp configured in the gang box to receive a supply wire from the electrical cable; wherein the neutral wire, ground wire and the supply wire energizes the gang box; further the gang box comprising; a plurality of first receiving prongs to energize the electrical outlet; wherein the plurality of first receiving prongs comprises: a first neutral receiving prong configured in the gang box to contact one of the plurality of energizable screw of the electrical outlet; a first ground receiving prong configured in the gang box to contact one of the plurality of energizable screw of the electrical outlet; and a first supply receiving prong configured in the gang box to contact one of the plurality of energizable screw of the electrical outlet; wherein the plurality of first receiving prongs energize the electrical outlet; wherein the respective first plurality of spring loaded receiving clamps and the respective first plurality of receiving prongs are each separable connected to each other via a conductive element; further comprising; a plurality of second receiving clamps to energize the electrical cable, wherein the plurality of second receiving clamps comprises: a second neutral receiving clamp configured in the breaker of the plurality of breakers to receive the neutral wire from the electrical cable; a second ground receiving clamp configured in the breaker of the plurality of breakers to receive the ground wire from the electrical cable; and a second supply receiving clamp configured in the breaker of the plurality of breakers to receive the supply wire from the electrical cable; a plurality of buses disposed in the breaker box, wherein the plurality of buses comprises a neutral bus; a ground bus and a supply bus; a plurality of second receiving prongs in the breaker of the plurality of breakers energize the electric cable; wherein the plurality of second receiving prongs comprises: a second neutral receiving prong configured in the breaker of the plurality of breakers to receive the neutral bus in the breaker box; a second ground receiving prong configured in the breaker of the plurality of breakers to receive the ground bus in the breaker box a second supply receiving prong configured in the breaker of the plurality of breakers to receive the supply bus in the breaker box; wherein the electrical outlet receives power directly from the electrical cable through the plurality of first receiving clamps and the plurality of first receiving prongs without manual wiring requirements; and wherein the electrical cable receives power directly from the power supply cable through the breaker of the plurality of breakers via the plurality of second receiving clamps and the plurality of second receiving prongs without manual wiring requirements inside the breaker box.

6. The electrical unit according to claim 5, wherein the breaker box further comprising an observational window to view installation of the electrical wires from the electrical cable to the second receiving clamps.

7. The electrical unit according to claim 5, further comprises side knockout slots for direct side access to the plurality of breakers for the electrical cable.

8. The electrical unit according to claim 7, wherein the breaker box further comprises an attachment unit to compress each of the plurality of second receiving clamps onto the electric wires from the electrical cable.

9. The electrical unit according to claim 8, wherein the breaker box further comprises front knockout slots for direct front access to the plurality of breakers and the attachment units, wherein the front knockout slots allow operating of the attachment units without opening of the breaker box.

* * * * *